US006522653B1

United States Patent
Kilkki

(10) Patent No.: US 6,522,653 B1
(45) Date of Patent: Feb. 18, 2003

(54) USE OF PRIORITIES DEFINED BY A CUSTOMER IN A SIMA NETWORK

(75) Inventor: Kalevi Kilkki, Lexington, MA (US)

(73) Assignee: Nokia Telecommunications Oy (FI)

( * ) Notice: Subject to any disclaimer, the term of this patent is extended or adjusted under 35 U.S.C. 154(b) by 0 days.

(21) Appl. No.: 09/159,005

(22) Filed: Sep. 23, 1998

(51) Int. Cl.[7] .............................................. H04L 12/56
(52) U.S. Cl. .............................. 370/395.42; 370/395.21
(58) Field of Search .......................... 370/391, 395.43, 370/395.42, 353, 389, 229–240, 351, 352, 537, 401; 709/223, 226, 227

(56) References Cited

U.S. PATENT DOCUMENTS

| | | | |
|---|---|---|---|
| 5,099,235 A | | 3/1992 | Crookshanks |
| 5,555,264 A | * | 9/1996 | Sallberg et al. |
| 6,011,778 A | | 1/2000 | Kilkki et al. ................ 370/232 |
| 6,041,039 A | | 3/2000 | Kilkki et al. ................ 370/230 |
| 6,047,326 A | | 4/2000 | Kilkki ......................... 709/220 |
| 6,081,505 A | | 6/2000 | Kilkki ......................... 370/230 |
| 6,081,843 A | | 6/2000 | Kilkki et al. ................ 709/232 |
| 6,104,698 A | * | 8/2000 | Fan et al. .................... 370/232 |
| 6,212,163 B1 | * | 4/2001 | Aida ........................... 370/230 |
| 6,226,266 B1 | * | 5/2001 | Galand et al. .............. 370/235 |
| 6,269,079 B1 | * | 7/2001 | Marvin et al. .............. 370/230 |

FOREIGN PATENT DOCUMENTS

| | | |
|---|---|---|
| DE | 44 41 356 A1 | 1/1995 |
| EP | 753 979 A | 1/1997 |

OTHER PUBLICATIONS

"Charging and Billing Issues in High Speed Heterogeneous Networking Environments", Raffali–Schreinemachers et al., *Global Information Infrastructure (GN) Evolution*, Jan. 10, 1996, pp. 97–108.

"Tariffs and effective bandwidths in multiservice networks", Kelly, *Teletraffic Science and Engineering*, vol. 1A, Jun. 6, 1994, pp. 401–410.

"Quality of Service Guarantees and Charging in Multiservice Networks", *IEICE Trans. Commun.*, vol. E81–B, No. 5, May 1998, pp. 824–831.

Translation of abstract for German Patent No. DE 44 41 356 A1.

"Decentralized network connection preemption algorithms"; Peyravian & Kshemkalyani; *Computer Networks and ISDN Systems*; 1998; pp. 1029–1043.

"Joint Source/Channel Coding of Statistically Multiplexed Real–Time Services On Packet Networks"; Garrett et al.; *ACM Transactions on Networks, U.S.*; IEEE Inc., New York, vol. 1, No. 1, 1993; pp. 71–80.

"Simple Integrated Media Access (SIMA)"; K. Kilkki; *Network Working Group Internet–Draft*; http://www–nrc.nokia.com/sima>; Jun. 1997; pp. 1–21.

"Integrated Services in the Internet Architecture: an Overview"; Braden et al., *Network Working Group*; http://www.ietf.org/rfc/rfc/633.txt; Jun. 1994; pp. 1–31.

"Internet Protocol, Version6 (IPv6) Specification"; Deering and Hinden, *Network Working Group*; http://afs.wu–wien.ac.at/manuals/rfc/rfc1883.txt; Dec. 1995, pp. 1–35.

"Meeting the challenges of deploying the global broadband network infrastructure"; *1998 IEEE ATM Workshop Proceedings*; May 26–29, 1998; pp. 225–233.

* cited by examiner

Primary Examiner—Ken Vanderpuye
(74) Attorney, Agent, or Firm—Altera Law Group LLC

(57) ABSTRACT

A method, system, and article of manufacture for generating at least two priority levels for a Nominal Bit Rate (NBR) based on at least two relative priorities defined by a customer and transmitting packets of information via a network with one of the at least two priority levels. The packets are transmitted from one network access unit to another network access unit. The network can be a SIMA network or other networks, such as a conventional IP (Internet Protocol) or ATM network. The method, system, and article of manufacture can also be used between the SIMA network and other networks to improve interoperability therebetween.

6 Claims, 4 Drawing Sheets

USE OF PRIORITIES DEFINED BY A CUSTOMER IN A SIMA NETWORK

RELATED PATENT APPLICATION

The present invention relates to U.S. patent application Ser. No. 09/146,862, filed Sep. 3, 1998, entitled "USE ALLOWED PRIORITY LEVEL FOR ROUTING DECISION IN SIMA NETWORKS",NC7929, and U.S. patent application, Ser. No. 09/120,607, filed Jul. 22, 1998 now U.S. Pat. No. 6,249,816, entitled "NBR POOL-FOR SIMA NETWORK", NC 7959, the subject matter of which is hereby incorporated by reference.

BACKGROUND OF THE INVENTION

1. Field of the Invention

This invention relates in general to communication systems, and more particularly, to a method and system for managing information communicated over a Simple Integrated Media Access (SIMA) network or an interface between a SIMA and other networks, such as a conventional IP (Internet Protocol) or ATM network, by using priorities defined by a customer.

2. Description of Related Art

Simple Integrated Media Access (SIMA) is a new way of introducing new properties for packet-based data networks, such as TCP/IP or ATM networks. The basic idea of SIMA relies on the use of eight packet-discarding priority levels, as described in details in the above-mentioned patent applications, entitled "NOMINAL BIT RATE. NETWORK SERVICE", NC 7664, Ser. No. 08/821,273, filed Mar. 20, 1997 now U.S. Pat. No. 6,163,808; U.S. patent application entitled "CELL SCHEDULING SYSTEM AND METHOD FOR NETWORK NODES", NC 7665, Ser. No. 08/822,266, filed March 20, 1997 now U.S. Pat. No. 6,081,505, and U.S. patent application entitled "ACCOUNTING SYSTEM AND METHOD FOR A NOMINAL BIT RATE NETWORK SERVICE". NC 7701, Ser. No. 08/822,270, filed Mar. 20, 1997 now U.S. Pat No. 6,047,326, the subject matter of which is hereby incorporated by reference. Every data packet is equipped with a priority level (PL) that can be an integer between 0 and 7.

In a basic SIMA network, priority is used for selecting packets that are discarded during congestion of a network node. The priority is determined from the ratio of a momentary actual bit rate of the source (a customer) to the Nominal Bit Rate (NBR) assigned to the source (the customer). This determination is generally performed in a network access node that is the first network element to receive a packet from a customer equipment.

One problem of the basic SIMA network is that it does not make possible for a customer to define what is the importance of a packet or cell, for example, in a case of 2-layer video coding, in which one layer video coding requires a higher priority level than the other layer. Another example is that a customer may want to send acknowledge packets with a higher priority than its normal data packets.

A possible solution to solving this problem is to use one connection for each desired priority level and to allocate proper Nominal Bit Rate (NBR) for two or more connections. However, the use of different connections has at least two drawbacks. One is that the network cannot usually guarantee that two or more connections use the same route for sending the packets. As a result, the delays of the two or more connections may differ significantly. This may yield problems at a receiving equipment. The second drawback is that the total NBR cannot be divided flexibly between the two or more connections, and on the other hand the NBR must be determined separately for the two or more connections. Accordingly, if a customer is only sending packets on a certain priority level, the NBR of the other priority level will be wasted.

Another problem of the basic SIMA concept is that a NBR measuring algorithm is only designed for fixed size packets or cells. It does not satisfy the need to measure NBR for variable size packets.

In the basic SIMA network, each connection (i) has a Nominal Bit Rate (NBR), which determines the relative amount of network capacity liable to the connection at a given instant. The network measures the actual bit rate (MBR) of the connection at the network interface. After the measurement, the network gives each packet (j) a priority, PL(i,j), based on the MBR to NBR ratio using the following formula:

$$x = 4.5 - \ln\left(\frac{MBR(i, j)}{NBR(i)}\right) / \ln(2) \quad (1)$$

$$PL(i, j) = \begin{cases} 6 & \text{if } x \geq 6 \\ Int(x) & \text{if } 0 < x < 6 \\ 0 & \text{if } x \leq 0 \end{cases}$$

where Int(x) is the integer part of x.

One drawback of this method is that a customer can effect on the priority of an individual packet only by changing an interarrival time between consecutive packets, because the NBR of the connection cannot be changed in time scale of a packet. This method is difficult for most customer's applications.

Accordingly, there is a need in communication industry for a network management architecture and method that allow a customer to define what is the importance of a data packet communicated over a Simple Integrated Media Access (SIMA) network. In addition, there is a need for a network management architecture and method that measure NBR based on variable size packets. The present invention provides a solution to the above and other problems and offers other advantages over the prior art.

SUMMARY OF THE INVENTION

To overcome the limitations in the prior art described above, and to overcome other limitations that will become apparent upon reading and understanding the present specification, the present invention discloses a method and system for using priorities defined by the customer in a SIMA network.

The present invention relates to communication systems, and more particularly, to a method and system for managing information communicated over a Simple Integrated Media Access (SIMA) network or an interface between a SIMA and other networks, such as a conventional IP (Internet Protocol) or ATM network, by using priorities defined by a customer.

In one embodiment, the present invention provides a system which includes a priority level pool unit generating at least two priority levels for a Nominal Bit Rate (NBR) based on at least two relative priorities defined by a customer and a network access unit transmitting packets of information via a network with one of the at least two priority levels. Accordingly, the Nominal Bit Rate (NBR) is used dynamically between two (or several) traffic sub-streams (or routes) with different priorities.

Further in one embodiment, the system further includes a customer management unit, the customer management unit providing the NBR to the priority level pool unit, the NBR being predefined between the customer and the network.

Still in one embodiment, the network is a SIMA network. Alternatively, the network can be other networks such as a conventional IP (Internet Protocol) or ATM network, or a network between SIMA network and other networks. The networks of the present invention use a service with two priority levels.

Yet in one embodiment, the at least two priority levels of the packets are determined by using an MBR (actual bit rate) to NBR ratio added by the relative priorities defined by the customer. The actual bit rate of both priority levels is measured separately. The total measured bit rate (MBR) are calculated by weighed sum of the measured results. In one embodiment, the total MBR are calculated in a way such that the weight is doubled when the priority level is increased by one.

In one embodiment, the present invention also provides a method which includes generating at least two priority levels for a Nominal Bit Rate (NBR) based on at least two relative priorities defined by a customer and transmitting packets of information via a network with one of the at least two priority levels.

Further in one embodiment, the method further includes providing the NBR to a priority level pool unit by a customer management unit of the network, the NBR being predefined between the customer and the network; providing the at least two relative priorities, defined by the customer, to the priority level pool unit; generating at least two priority levels by the priority level pool unit for the packets of information at a network access unit; and transmitting the packets of information with one of the at least two priority levels via the network access unit.

Still in one embodiment, the network is a SIMA network. The present invention can also be used in the other networks, such as a conventional IP (Internet Protocol) or ATM network, which may require a service with two or more priority levels. In addition, if a NBR is attached to an interface between networks, rather than a network access node or connection of a network, the present invention can provide a service that the NBR is divided dynamically among different connections, which may have different quality requirements.

One advantage of the present invention is that it allows the customer to define the priority which corresponds to the importance of a packet. The route of all packets or cells is the same for both priority levels. Further, both priority levels use the same NBR.

Another advantage of the present invention is that the NBR measuring algorithm is designed to work with fixed size packets as well as variable size packets.

A further advantage of the present invention is that it improves interoperability between SIMA network and other networks or services. These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

This invention relates to a communication system, and more particularly, to a method and system for managing information communicated over a Simple Integrated Media Access (SIMA) network or an interface between a SIMA and other networks, such as a conventional IP (Internet Protocol) or ATM network, by using priorities defined by a customer.

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention. It is appreciated that the applications of the present invention can be in a SIMA network or in an interface between a SIMA network and other networks, such as a conventional IP (Internet Protocol) or ATM network.

| | |
|---|---|
| NBR: | Nominal Bit Rate [bit/s] |
| ATM: | Asynchronous Transfer Mode |
| PL: | Priority Level (0, 1, ..., or 7) |
| SIMA: | Simple Integrated Media Access |
| MBR: | Actual Bit Rate [bit/s] |
| T(j): | Arrival time of the packet [ms] |
| S(j): | Size of the packet [bytes] |
| C(j): | Priority class of the packet (either 0 or 1) defined by a customer |
| T(j − 1): | Arrival time of the previous packet [ms] |
| $T_0$: | Arrival time of the previous packet belonging to class 0 |
| $T_1$: | Arrival time of the previous packet belonging to class 1 |
| $T_0^*$: | Arrival time of the previous packet belonging to class 0 |
| $T_1^*$: | Arrival time of the previous packet belonging to class 1 |
| P(k): | Relative priority of a packet belonging to class k |
| α: | Constant that defines a measuring period [1/ms] |
| β: | Constant that defines how long measurement result of an idle priority class will be taken into account [1/ms] |
| $S_{min}$: | Minimum packet size [bytes] |

High Level Illustration of the Present Invention

Figure 1:
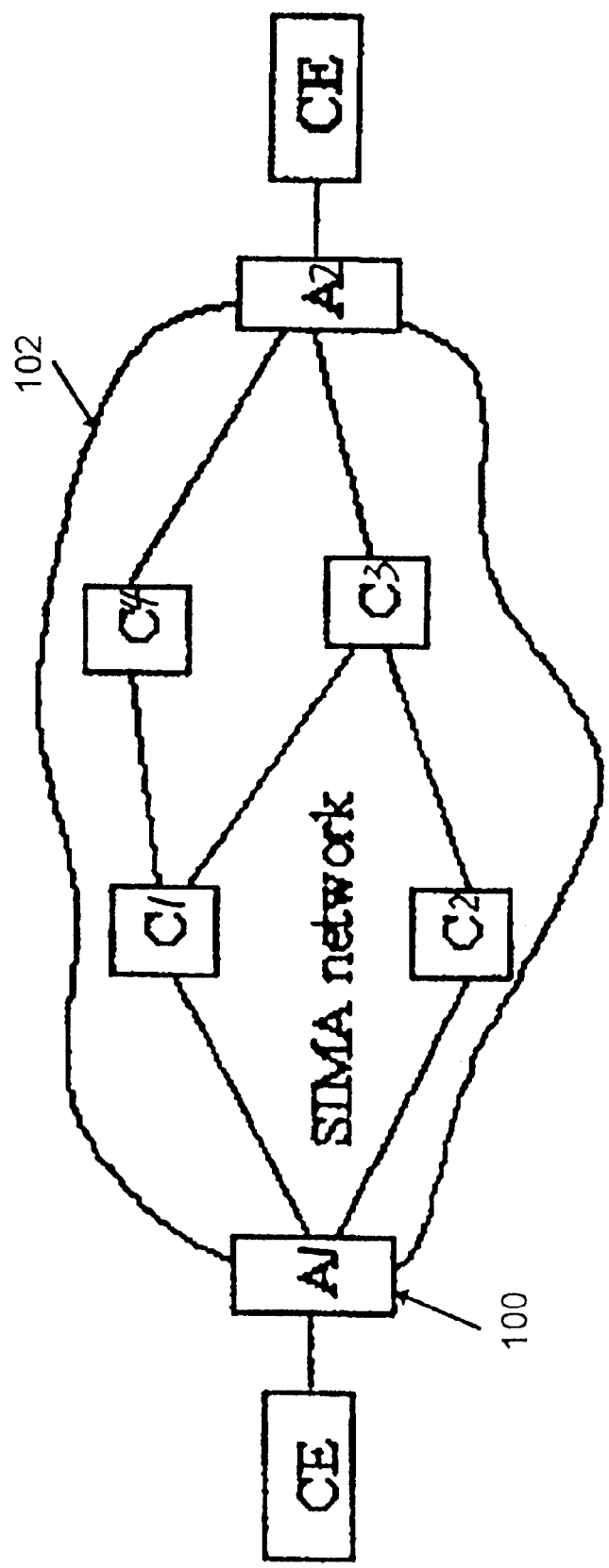
FIG. 1 illustrates SIMA network nodes used in communication from one customer to the other in a SIMA network in which a priority level pool of the present invention can be adapted.

In FIG. 1, a priority level pool unit 100 in accordance with the present invention is adapted to a SIMA network 102. It is appreciated that the priority level pool unit 100 can also be adapted to or equipped with other networks, such as a conventional IP (Internet Protocol) or ATM network, etc.

In general, when a customer or customer equipment (CE1) sends data packets or cells to another customer or customer equipment (CE2), customer CE1 accesses the network at node A1 (network access node). There are several routes, for examples, A1C1C4A2, A1C1C3A2, A1C2C3A2, or A1C2C3C1C4A2, etc., to reach another network access node A2 accessible to customer or customer equipment CE2. C1, C2, C3, C4 are network core nodes, and A1, A2 are SIMA network access nodes. Accordingly, packets (frames or cells) of information are transmitted from one customer to the other customer via the network access nodes and network core nodes.

Figure 2:
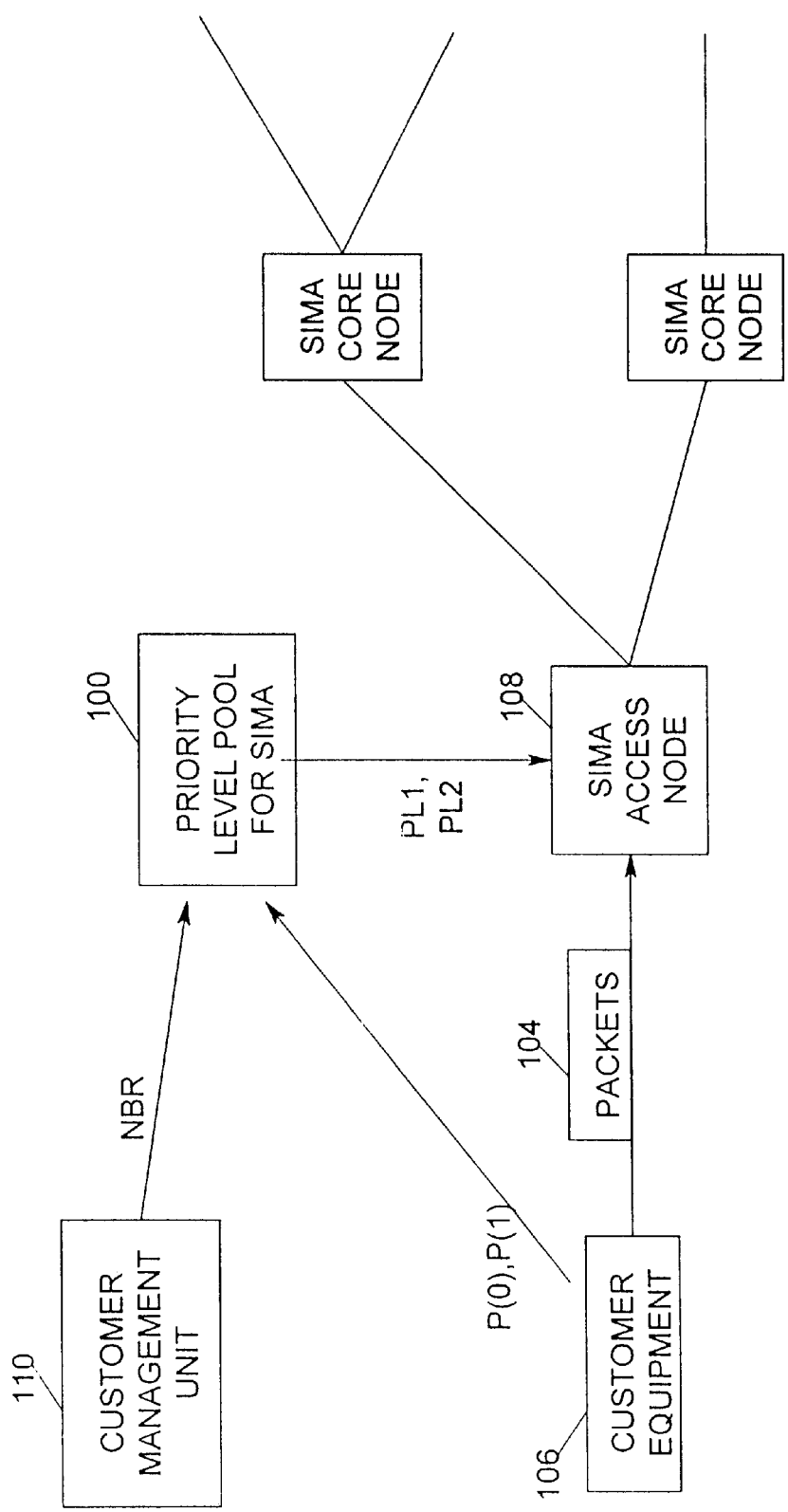
FIG. 2 is a block diagram of one embodiment of the priority level pool adapted for a SIMA network in accordance with the present invention.

FIG. 2 illustrates a block diagram of the priority level pool unit 100 for the SIMA network 102 according to the present invention. Packets of information 104 are transmitted from a customer equipment 106 to a SIMA access node 108. A Nominal Bit Rate (NBR) for determining a priority level of the packets 104 at the SIMA access node 108, is provided by a customer management unit 110. The customer equipment 106 defines relative priorities, P(0),P(1), e.g. P(0) is 0, and P(1) is −2, for sending its packets with priority levels calculated from P(0),P(1). P(0) is a referenced priority. In one embodiment, two classes of priorities are defined by a customer as an example for illustration and explanation. It is appreciated that more than two classes of priorities can be defined by a customer for transmitting its packets with different priority levels. Further in a preferred embodiment, P(0)=0.

The priority level pool unit 100 is coupled to the customer management unit 110 which provides the priority level pool unit 100 with a NBR. In one embodiment, the NBR can be selected by the customer based on a fee paid to the network service provider. The priority level pool unit 100 is also coupled to the customer equipment 106 which provides the priority level pool unit 100 with two relative priorities desired by the customer P(0)/P(1). Based on the values of NBR and P(0)/P(1), the priority level pool unit 100 determines two priority levels PL1,PL2 for transmitting the consecutive packets with the same NBR requirement.

Detailed Implementation of Priority Level Pool

A customer sends packets 104 into the SIMA network 102. Packet 0) has the properties T(j), S(j), and C(j) (C(j) is referred to by P(0) and P(1)) which are defined by the customer. For example, T(j)=0.2·j ms
S(j) $S_{min}$=50 bytes
P(0)=0
P(1)=−2

The network has a α constant for defining the measuring period [1/ms], and a β constant for defining how long measurement result (MBR and PL) of an idle priority class (i.e. two priority classes have the same priority) are taken into account [1/ms]. For example, α=1/ms
β=0.01/ms In one implementation, parameters (or referred to as counters), Y(0,j), Y(1,j), M(0,j), M(1,j), are used during the measurement of MBR and PL, where j indicates the value of the counter immediately after the arrival of packet j.

In one operation, when a packet (j) arrives at the network access node, the following procedures are undertaken:

If the incoming cell belongs to the priority class 0 then

1) $Y(0, j) = e^{-\alpha(T(j)-T(j-1))} \cdot Y(0, j-1) + S(j)/S_{min}$

2) $Y(1, j) = e^{-\alpha(T(j)-T(j-1))} \cdot Y(1, j-1)$ 3) if $(Y(0, j) > S(j)/S_{min} + 0.0001)$ then $z = \dfrac{S_{min} \cdot \alpha}{-\ln(1 - 1/Y(0, j))}$ else $z = 1000 S_{min}$ $M(0, j) = \text{Min}\left(z, \dfrac{S(j)^2}{T(j) - T_0^*}\right)$ 4) $M(1, j) = e^{-\beta(T(j)-T(j-1))} \cdot M(1, j-1)$ and if the incoming cell belongs to the priority class 1 then 1) $Y(0, j) = e^{-\alpha(T(j)-T(j-1))} \cdot Y(0, j-1)$ 2) $Y(1, j) = e^{-\alpha(T(j)-T(j-1))} \cdot Y(1, j-1) + S(j)/S_{min}$ 3) $M(0, j) = e^{-\beta(T(j)-T(j-1))} \cdot M(0, j-1)$ 4) if $(Y(1, j) > S(j)/S_{min} + 0.0001)$ then $z = \dfrac{S_{min} \cdot \alpha}{-\ln(1 - 1/Y(1, j))}$ else $z = 1000 S_{min}$ $M(1, j) = \text{Min}\left(z, \dfrac{S(j)^2}{T(j) - T_1^*}\right)$ and independent of the priority class of the packet or cell, the following calculations will be made:

$$MBR(j) = (2^{P(0)} M(0, j) + 2^{P(1)} M(1, J)) \cdot 8 \cdot 10^3 \qquad (1)^*$$

$$x = 4.5 - \ln\left(\dfrac{MBR(j)}{NBR}\right) / \ln(2) + P(C(j))$$

$$PL(j) = \begin{cases} 6 & \text{if } x \geq 6 \\ Int(x) & \text{if } 0 < x < 6 \\ 0 & \text{if } x \leq 0 \end{cases}$$

The main properties of the above method are:

1. If there are packets only from one priority class (k), the result (that is, the PL(j) for every (j) is independent of the desired priority (P(k)). In the above formula (1)*, the Nominal Bit Rate is constant (i.e. MBR(j)=NBR). Accordingly, the priority level PL of each packet is 4, or x=4.5.

Figure 3:
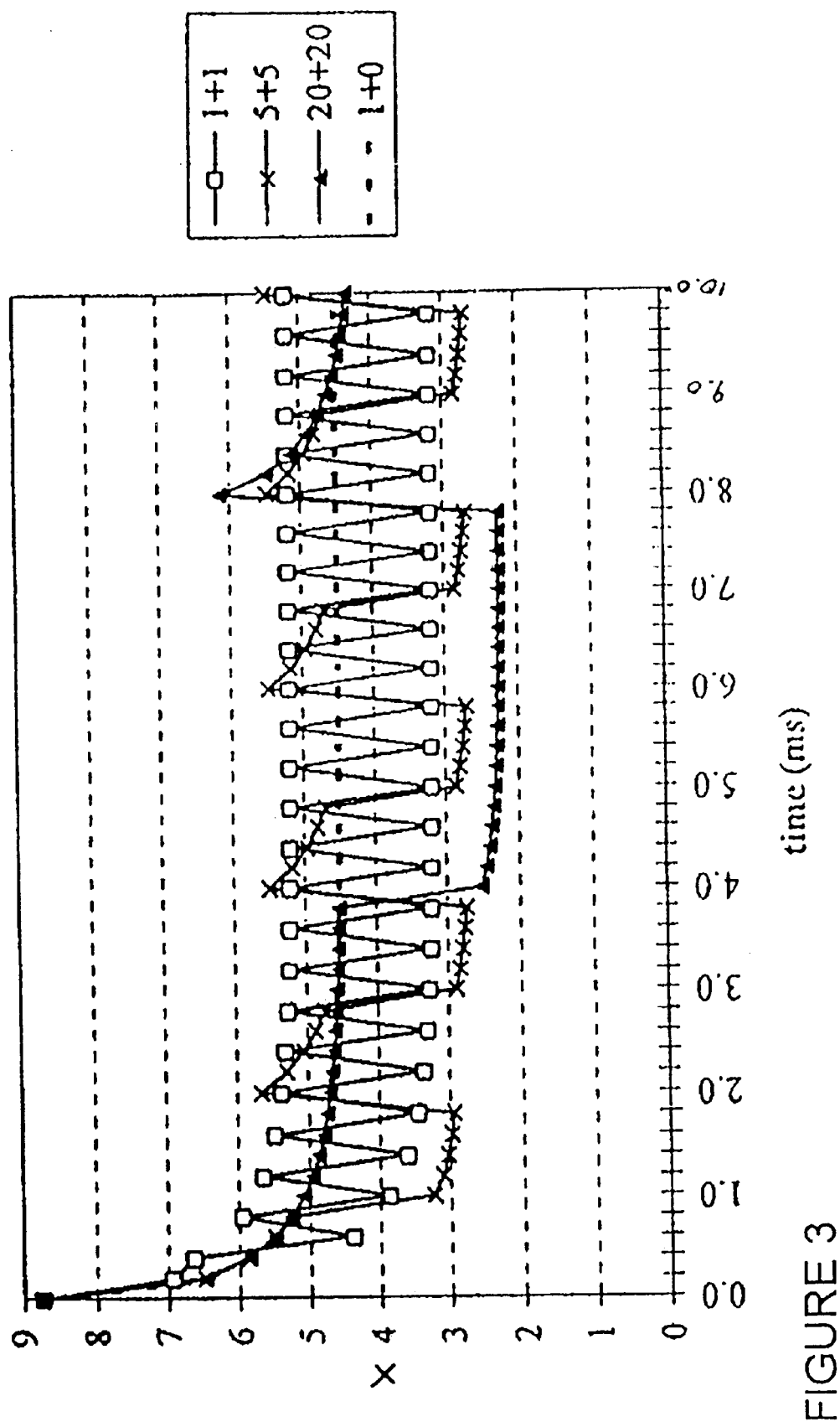
FIG. 3 is a schematic view of priority levels of different number of packets transmitted in succession in accordance with the present invention.
Figure 4:
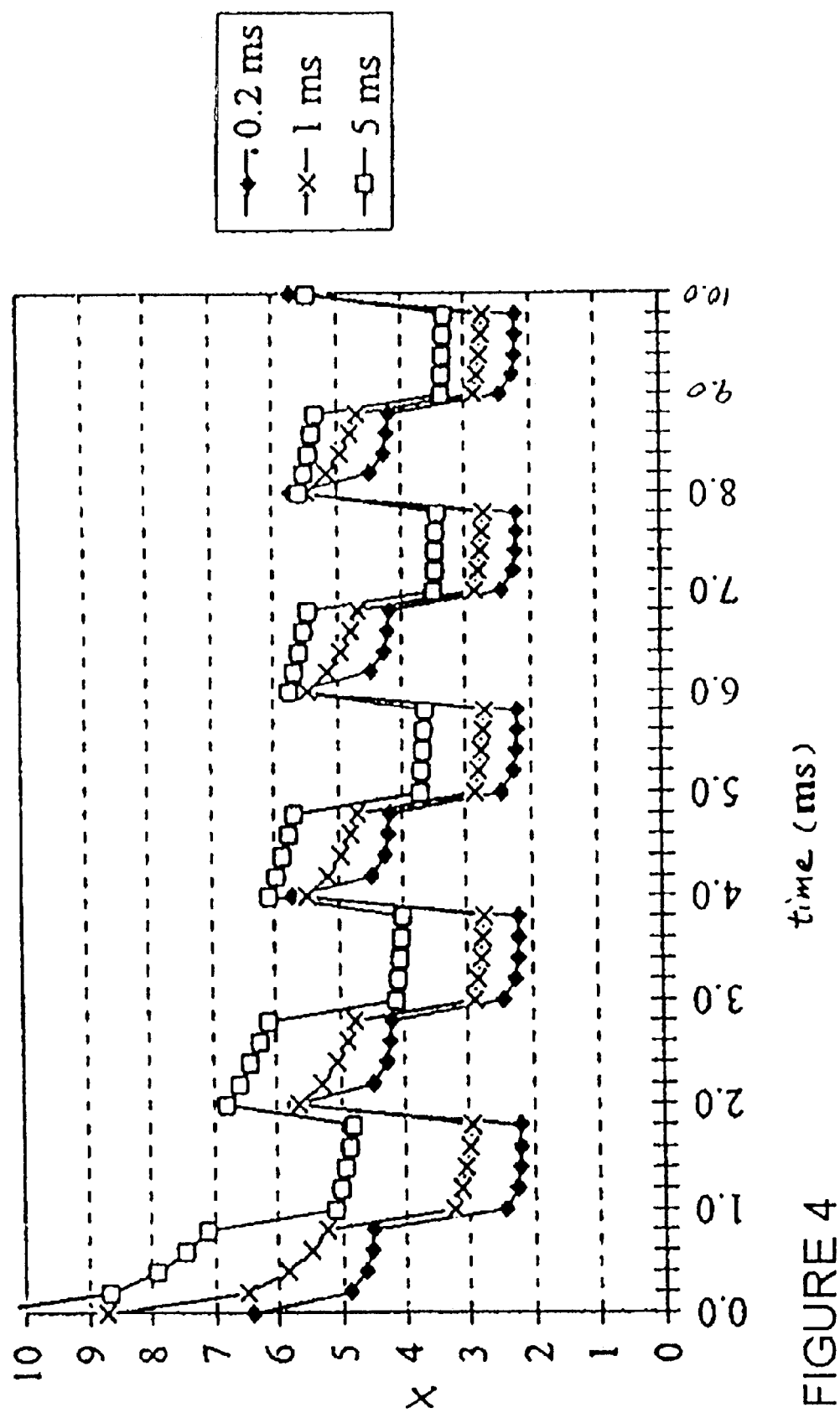
FIG. 4 is a schematic view of priority levels of different values of measuring interval time for 5+5 packets transmitted in succession in accordance with the present invention.

2. If the packet size, S(j), is multiplied by a constant greater than 1 and the inter-arrival time, T(j)-T(j−1), is multiplied by the same constant, the priority of the packet either decreases or remains the same. Therefore, for a given average bit rate, the best priority can be obtained by using the minimum packet size, i.e. S(j)=$S_{min}$ for every j. For simplicity, FIGS. 3 and 4 illustrate additional properties of the above method based on the following assumptions:

1) S(j)=$S_{min}$ for every j; and
2) Average bit rate of the connection under study is equal to the NBR FIG. 3 shows the packet priorities when T(j)=0.2·j ms
S(j)=$S_{min}$=50 bytes
P(1)=−2
α=1/ms
β=0.01/ms
NBR=2 Mbit/s.

In FIG. 3, priority levels (represented by values x) of packets for different number of packets, e.g. 1 packet, 5 packets, or 20 packets transmitted in succession. 1+1 refers to consecutive packets being transmitted with an alternate priority every other packet (in this case every 0.2 ms). 5+5 refers to consecutive packets being transmitted with an alternate priority every five packets (in this case every 1.0 ms). 20+20 refers to consecutive packets being transmitted with an alternate priority every twenty packets (in this case every 4 ms).

As shown in FIG. 3, the two priority levels (referring to x as before rounding) for 1+1 packets are about 3.2 and 5.2. Accordingly, when a customer defines relative priorities P(0),P(1) being 0,−2, the priority levels (referring to x before rounding) generated from the priority level pool unit 100 is 3.2 and 5.2. Similarly, the two priority levels for 5+5 packets are about 3 and 5, and the two priority levels for 20+20 packets are about 2.3 and 4.5. The following Table 1 shows seven examples of 1+1 packets wherein two relative priorities, P(0) is 0 and P(1) is 0, −1, −2, −3, −4, −5, and −6, respectively.

TABLE 1

| P(1) | 2 Mbit/s | | 20 kbit/s | |
|---|---|---|---|---|
| | x(k = 0) | x(k = 1) | x(k = 0) | x(k = 1) |
| 0 | 4.50 | 4.50 | 4.64 | 4.64 |
| −1 | 4.92 | 3.92 | 5.00 | 4.10 |
| −2 | 5.18* | 3.18* | 5.23 | 3.40 |
| −3 | 5.33 | 2.33 | 5.36 | 2.58 |
| −4 | 5.41 | 1.42 | 5.43 | 1.68 |
| −5 | 5.46 | 0.46 | 5.46 | .073 |
| −6 | 5.48 | −0.52 | 5.48 | −0.24 |

The x values with "*" are illustrated in FIG. 3 as discussed above. The above Table 1 is calculated based on the NBR and the relative priorities via the counters Y(0,j), Y(1,j), M(0,j), M(1,j) and method discussed above.

Further, the effect of using larger difference between the two priority classes is shown in Table 1. The same traffic (NBR) and system parameters are used as in FIG. 3, except that the desired priority for class I varies from 0 to −6. In addition to the 2 Mbit/s source, a source with much lower bit rate is considered (i.e. both the inter-arrival time of packets and NBR of the connection are changed). In one example, the NBR is 20 kbit/s, and the inter-arrival time between two consecutive packets is much longer than 0.2 ms, 1 ms, or 4 ms. In general, since a customer often desires to transmit its packets with a high priority level, the value of the high priority level is the concern, i.e. the larger the high priority level is, the better result is obtained through this method. It can be seen from Table 1 that packets with the lower NBR can obtain a larger high priority level. On the other hand, when the defined relative priorities P(0) and P(1) are 0 and −5 or −6, the high priority level between the two NBRs are the same, i.e. both are 5.46, or 5.48, respectively. Accordingly, for a larger amount of traffic (i.e. larger NBR), the relative priorities are preferred to be larger.

FIG. 4 illustrates priority levels of different values of measuring interval time 1/α (e.g. 0.2 ms, 1 ms, or 5 ms) for 5+5 packets transmitted in succession in accordance with the present invention. The traffic and system parameters are the same as in FIG. 3 except that the value of a varies. As shown in FIG. 4, the two priority levels with the measuring interval time being 0.2 ms are 2.2 and 4.2; the two priority levels with the measuring interval time being 1 ms are 2.8 and 5; and the two priority levels with the measuring interval time being 5 ms are 3.3 and 5.5. Accordingly, the larger the measuring interval time is, the larger the high priority level can be obtained.

In addition, FIGS. 3 and 4 illustrate that the priority level pool unit 100 provides a larger high priority level when low and high priority packets are transmitted in turn, or α ΔT(k)<1 , for k=(0, 1), where ΔT(k) is the inter-arrival time between two consecutive packets belonging to priority class k, and 1/ α is the measuring interval time.

If the time scale of variations 1/ α is long enough, the measuring scheme may not remember the past traffic process, but the priority levels can be determined according to the traffic of the active priority class.

In the preferred embodiment, the network is a SIMA network. It is appreciated that the above method and system can also be used in the other networks, such as a conventional IP (Internet Protocol) or ATM network, etc., which may require a service with two or more priority levels. It is also appreciated that if a NBR is attached to an interface between networks, rather than a network access node or connection of a network, the present invention can provide a service that the NBR is divided dynamically among different connections, which may have different quality requirements. Accordingly, the interoperability between the SIMA network and other networks or services are improved.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method comprising:

generating at least two priority levels for a Nominal Bit Rate (NBR) based on at least two relative priorities defined by a customer and transmitting packets of information via a network with one of the at least two priority levels, wherein the network is a SIMA network;

providing the NBR to a priority level pool unit by a customer management unit of the network, the NBR being predefined between the customer and the network;

providing the at least two relative priorities, defined by the customer, to the priority level pool unit;

generating at least two priority levels by the priority level pool unit for the packets of information at a network access unit; and transmitting the packets of information with one of the at least two priority levels via the network access unit.

2. The method of claim 1, wherein the at least two priority levels of the packets are determined by using an MBR (actual bit rate) to NBR ratio added by the relative priorities defined by the customer.

3. A system comprising:

a priority level pool unit generating at least two priority levels for a Nominal Bit Rate (NBR) based on at least two relative priorities defined by a customer and a network access unit transmitting packets of information via a network with one of the at least two priority levels, wherein the network is a SIMA network; and a customer management unit, the customer management, unit providing the NBR to the priority level pool unit, the NBR being predefined between the customer and the network.

4. The system of claim 3, wherein the at least two priority levels of the packets are determined by using an MBR (actual bit rate) to NBR ratio added by the relative priorities defined by the customer.

5. An article of manufacture for a computer-based data processing system, the article of manufacture comprising a computer readable medium having instructions for causing a computer to perform a method comprising:

generating at least two priority levels for a Nominal Bit Rate (NBR) based on at least two relative priorities defined by a customer and transmitting packets of information via a network with one of the at least two priority levels, wherein the network is a SIMA network;

providing the NBR to a priority level pool unit by a customer management unit of the network, the NBR being predefined between the customer and the network;

providing the at least two relative priorities, defined by the customer, to the priority level pool unit;

generating at least two priority levels by the priority level pool unit for the packets of information at a network access unit; and transmitting the packets of information with one of the at least two priority levels via the network access unit.

6. The article of manufacture of claim 5, wherein the at least two priority levels of the packets are determined by using an MBR (actual bit rate) to NBR ratio added by the relative priorities defined by the customer.

* * * * *